(12) United States Patent  
Papamarcos et al.

(10) Patent No.: US 12,293,070 B2  
(45) Date of Patent: *May 6, 2025

(54) JUST-IN-TIME SNAP LAYOUTS

(71) Applicant: Microsoft Technology Licensing, LLC, Redmond, WA (US)

(72) Inventors: Eric Papamarcos, Sammamish, WA (US); Robert Disano, Seattle, WA (US); Stacy Carson, Seattle, WA (US); Albert Yih, Seattle, WA (US); Benjamin B. Stolovitz, Seattle, WA (US); Howard Hughes, Port Orchard, WA (US); Selena Feng, Chicago, IL (US); Bret Anderson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,869

(22) Filed: Oct. 12, 2023

(65) Prior Publication Data

US 2024/0036722 A1    Feb. 1, 2024

Related U.S. Application Data

(63) Continuation of application No. 17/804,806, filed on May 31, 2022, now Pat. No. 11,868,160.

(Continued)

(51) Int. Cl.
*G06F 3/0486* (2013.01)
*G06F 3/0482* (2013.01)

(52) U.S. Cl.
CPC .......... *G06F 3/0486* (2013.01); *G06F 3/0482* (2013.01)

(58) Field of Classification Search
CPC .... G06F 3/0486; G06F 3/0482; G06F 3/0481; G06F 3/0488; G06F 2203/04803
See application file for complete search history.

(56) References Cited

U.S. PATENT DOCUMENTS 9,928,230 B1 *   3/2018   Jain ..................... G06F 40/186  
11,210,112 B1 * 12/2021   Tan ......................... G06F 9/542  
(Continued)

OTHER PUBLICATIONS

Final Office Action mailed on Dec. 29, 2023, in U.S. Appl. No. 17/123,052, 40 pages.

(Continued)

*Primary Examiner* — Hien L Duong

(57) ABSTRACT

Systems and methods for reconfiguring application windows in a display. An example method includes displaying a first application window and a second application window; receiving a drag input for moving the first application window; based on the drag input entering an invocation region, displaying a layout menu with a plurality of display layouts, each of the display layouts including one or more snap zones; receiving a hover of the first application window over a particular snap zone of a particular display layout of the plurality of display layouts; based on the hover of the first application window over the particular snap zone, displaying a zone-indicator pane corresponding to the particular snap zone; receiving a drop input of the first application window over the particular snap zone; and in response to the drop input, resizing and repositioning the first application window according the particular snap zone.

20 Claims, 16 Drawing Sheets

Related U.S. Application Data

(60) Provisional application No. 63/308,310, filed on Feb. 9, 2022.

(56) References Cited

U.S. PATENT DOCUMENTS

| | | | |
|---|---|---|---|
| 2010/0313165 A1* | 12/2010 | Louch | G06F 9/451 |
| | | | 715/792 |
| 2012/0081364 A1* | 4/2012 | Yamaji | G06T 19/20 |
| | | | 345/419 |
| 2014/0089831 A1 | 3/2014 | Kim et al. | |
| 2014/0096046 A1* | 4/2014 | Zhong | G06F 3/0481 |
| | | | 715/765 |
| 2016/0364122 A1* | 12/2016 | Shimomura | G06F 3/0481 |
| 2017/0329499 A1* | 11/2017 | Rauschenbach | G06F 3/04845 |
| 2018/0341647 A1* | 11/2018 | Hiraishi | G06F 16/00 |
| 2024/0411418 A1 | 12/2024 | Papamarcos | |

OTHER PUBLICATIONS

Notice of Allowance mailed on May 22, 2024, in U.S. Appl. No. 17/123,052, 15 pages.

Communication pursuant to Article 94(3) Received in European Patent Application No. 21827736.6, mailed on Nov. 13, 2024, 6 pages.

\* cited by examiner

JUST-IN-TIME SNAP LAYOUTS

CROSS-REFERENCE TO RELATED APPLICATIONS

This application is a continuation of U.S. patent application Ser. No. 17/804,806 filed May 31, 2022, which claims the benefit of U.S. Provisional Application No. 63/308,310 filed Feb. 9, 2022, titled "Just-In-Time Snap Layouts," and which applications are incorporated herein by reference in their entireties.

BACKGROUND

Recent development in the display technologies has brought diversification in display devices, and consumers now have a plenty of options in choosing display devices. For example, for web-browsing, email and light office work, consumers typically select a 24-inch or 27-inch full high definition (FHD, 1920×1080 pixels) widescreen (e.g., 16:9 aspect ratio) monitor. For photography, content creation or scientific/engineering tasks, consumers opt to select larger (e.g., 32 inches or 43 inches) monitors having a higher screen resolution (e.g., 4K or ultra-high definition (UHD), 3840×2160 pixels) or a 34-inch or 49-inch ultra-widescreen monitor having a 21:9 aspect ratio. Also, it became common to use two or more monitors horizontally or vertically side by side to have more information displayed simultaneously.

Such increase in screen real estate has allowed users to place more than two application windows simultaneously on a screen or screens. To help arrange the application windows, various attempts have been made. For example, some operating systems offer various screen snapping functions to have a particular application window placed at a particular portion of a screen. Also, monitor manufacturers and third-party software developers have offered various screen segmenting solutions to divide a screen into two or more segments, of which each can be used as a separate monitor screen. The existing solutions, however, are limited to placing an application window selected by a user to a specific area or segment (e.g., left or right half, top or bottom half) of a screen. Hence, for each application window, the user is required to specify in which portion of a screen the application window should be placed. In the case that there are more than two monitors, the user further needs to specify which monitor should be used in addition to identifying which portion or segment of the screen should be used. As such, there still remain significant areas for new and improved implementations for more streamlined and efficient configurations of application windows in a display.

SUMMARY

Aspects of the present technology relate to reconfiguring application windows within one or more displays to more efficiently use display space resources of the display(s). The present technology is able to provide a plurality of display layouts at a time when the user is already actively rearranging or reconfiguring one or more application windows that are currently being displayed. For instance, a user may rearrange windows by manually dragging and dropping windows in different positions of the desktop. The present technology may be activated upon, or based on, the receipt of a drag input for moving an application window. When the drag input moves the application window into an invocation region of the display, a menu of different display layouts is presented. The different display layouts include different snap zones that partition the display in various manners for display of the various application windows. Previews or indications of where the dragged application window will be displayed may be generated by dragging the application window over different snap zones of the different display layouts. For example, dragging the application window over a particular snap zone generates a zone-indicator pane that provides a preview of how the application window will be displayed if that particular snap zone is selected. A particular snap zone, and the corresponding display layout, may then be selected by dropping the dragged application window on one of the displayed snap zones.

Receiving the drop input of the dragged application window over a particular snap zone causes the application window to be resized and/or repositioned to correspond to the size and position of the particular snap zone. Pending-zone indicators for the remaining snap zones of the corresponding display layout are also concurrently displayed. Representations of other running application windows may be displayed within the pending zone indicators. Selection of one of the representations causes the corresponding application window to fill the pending-zone indicator in which the selected representation was displayed. As a result, the display of the application windows can be efficiently reconfigured and/or rearranged to maximize the effectiveness of the screen real estate of the display(s). Moreover, such reconfiguration options may be displayed just in time as the user is beginning to reconfigure one or more application windows through drag-and-drop inputs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
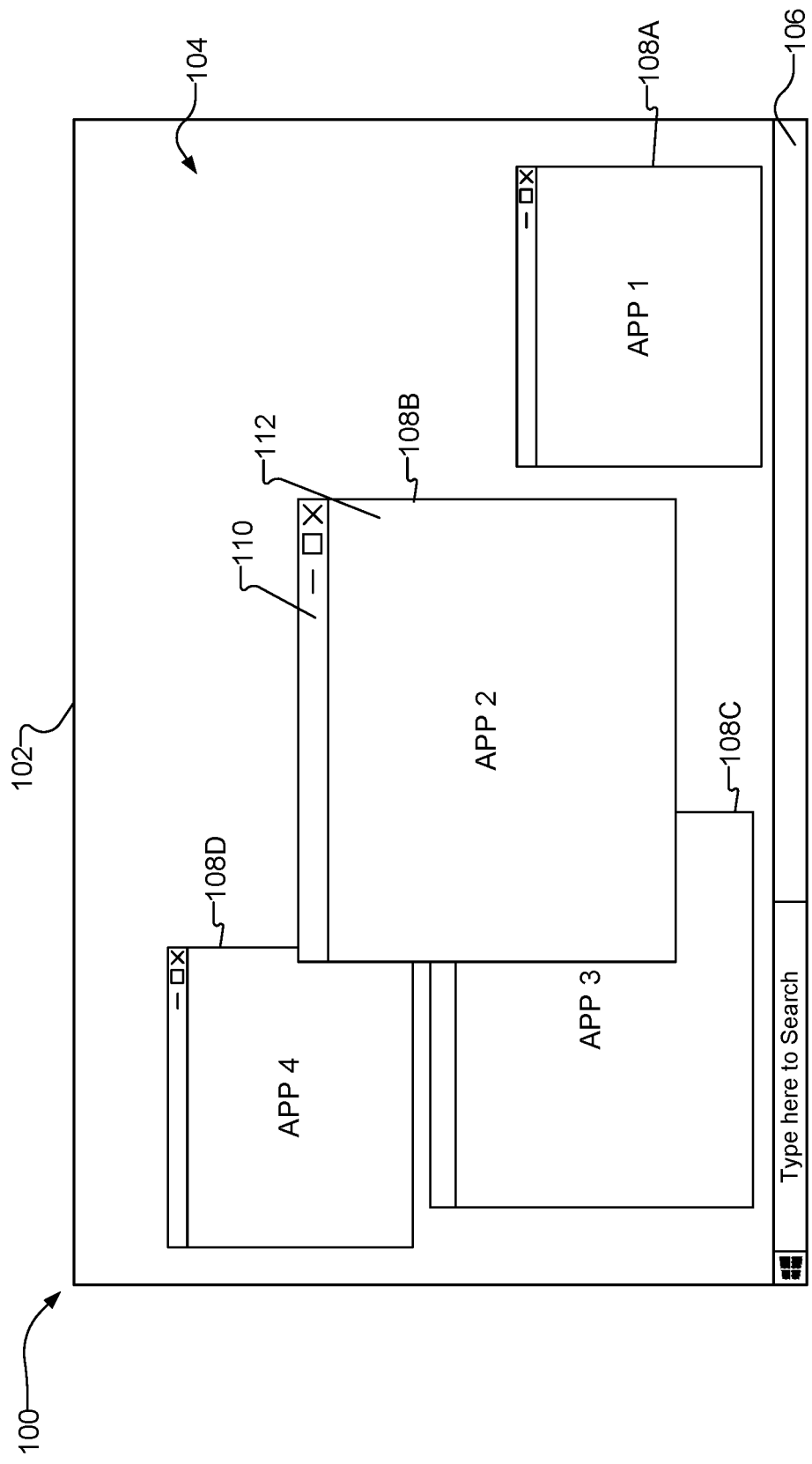
FIG. 1 depicts an example display with a plurality of application windows.

FIG. 1 depicts an example display 100 with a plurality of application windows 108. The example display 100 may be a display of any type of computing device, such as a laptop, desktop, tablet, smartphone, etc. In some examples, the display 100 is an external monitor or display that augments a native display or provides a sole display (such as being connected to a desktop tower). The display 100 displays a variety of components according to the commands and video/image inputs received from the computing device to which the display 100 is connected. The display 100 includes an outer border 102 that surrounds the visual display area (e.g., screen) of the display 100. In some instances, the display 100 includes, or is, a touch-screen device that receives touch inputs from a user.

In the example depicted, the display 100 is displaying a desktop 104 of an operating system such as operating system (OS), such as MICROSOFT WINDOWS, APPLE IOS, LINUX, GOOGLE CHROME, etc. Within the desktop 104, a plurality of application windows 108 are also displayed. More specifically, a first application window 108A, a second application window 108B, a third application window 108C, and a fourth application window 108D are displayed. The application windows 108 may correspond to different applications and/or different instances of the same application. For instance, the first application window 108A may be an application window of a word processing application, and the second application window 108B may be an application window for web browsing application.

Each of the application windows 108 may include a title bar 110 and a content area 112, among other features and/or components. The title bar 110 may include standard features that are common across multiple application windows 108, such as a minimize button, a maximize button, and a close button. In some examples, the title bar 110 may also include features that are specific to the type of application of the respective application window, such as a search bar or field. The content area 112 provides the content of the application of the application window 108. For example, where the application window 108 is for a web browsing application, the content area 112 may include a display of a web page. Similarly, where the application window 108 is for a word processing application, the content area 112 may display the document that is being created with the word processing application.

Selection of the title bar 110 may allow for the corresponding application window to be moved via a drag-and-drop input. For instance, selecting the title bar 110 of the second application window 108B and holding the selection allows for the second application window 108B to be moved around the desktop 104 based on the input received from the user.

Figure 2:
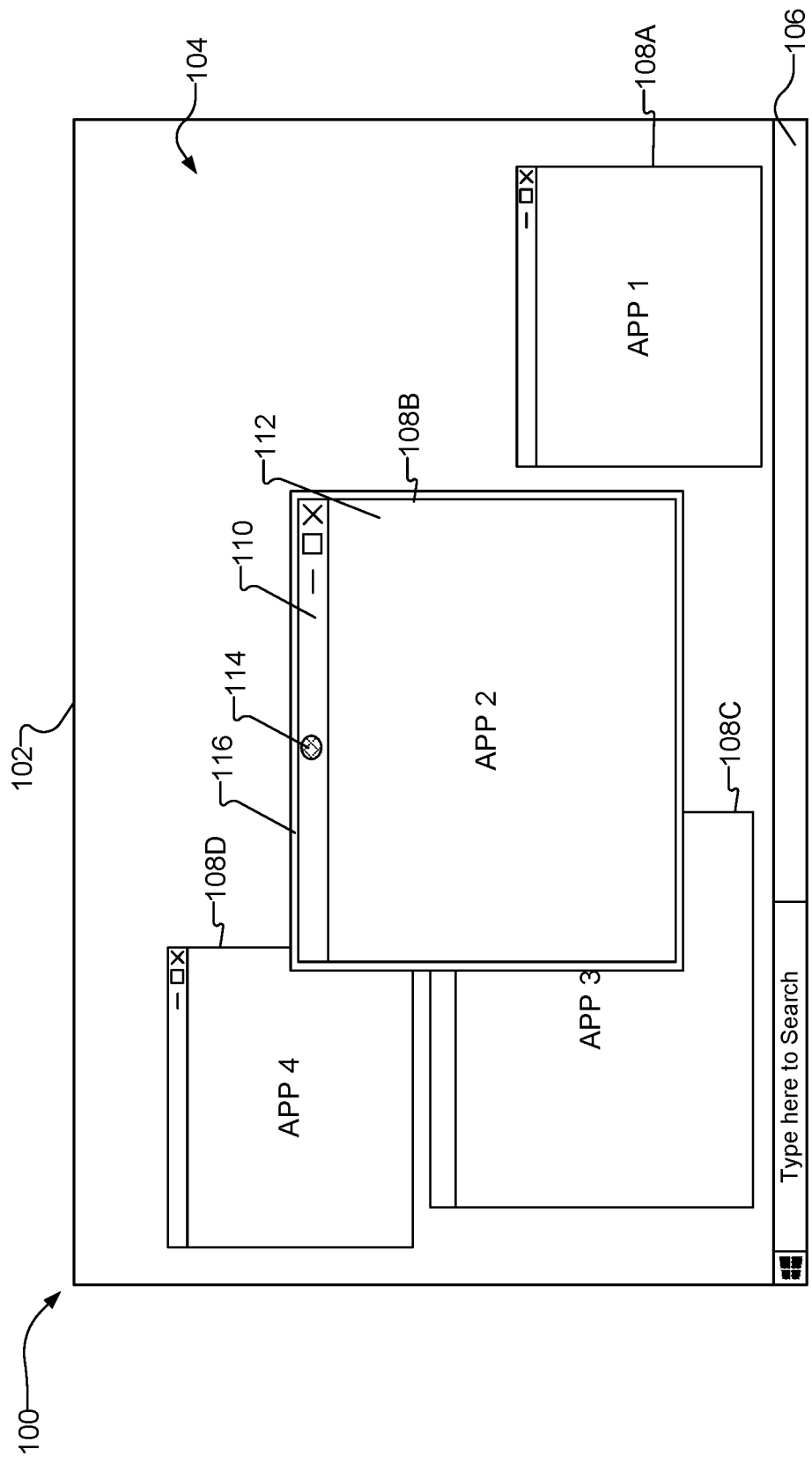
FIG. 2 depicts the example display with an input to move a particular application window.

FIG. 2 depicts the example display with an input 114 to move the second application window 108B. In the example depicted, the input 114 is a touch input that is received through the touch-screen of the display 100. In other examples, however, the input 114 may be a selection from a cursor controlled by a mouse or other input device, such as a trackpad or similar device.

When the touch input 114 is received and held on the title bar 110, the second application window 108B may be dragged or moved around the desktop 104. When the drag operation is performed, a drag-indication border 116 may be displayed around the second application window 108B to provide a visual indication that the second application window 108B is the application window that has been selected for moving. The drag-indication border may be an extended border displayed outside of the border of the particular application window 108 being dragged. The drag-indication border 116 may have different forms in other examples. For instance, the drag-indication border 116 may be displayed on fewer than all of the window edges, may provide a shadow effect, or may include another visual indicator or technique that indicates that the window has been selected for movement. In some examples, the drag-indication border 116 may only be displayed when the touch input 114 is a touch input. For instance, when the input 114 is a cursor input, the drag-indication border 116 may not be displayed.

Figure 3:
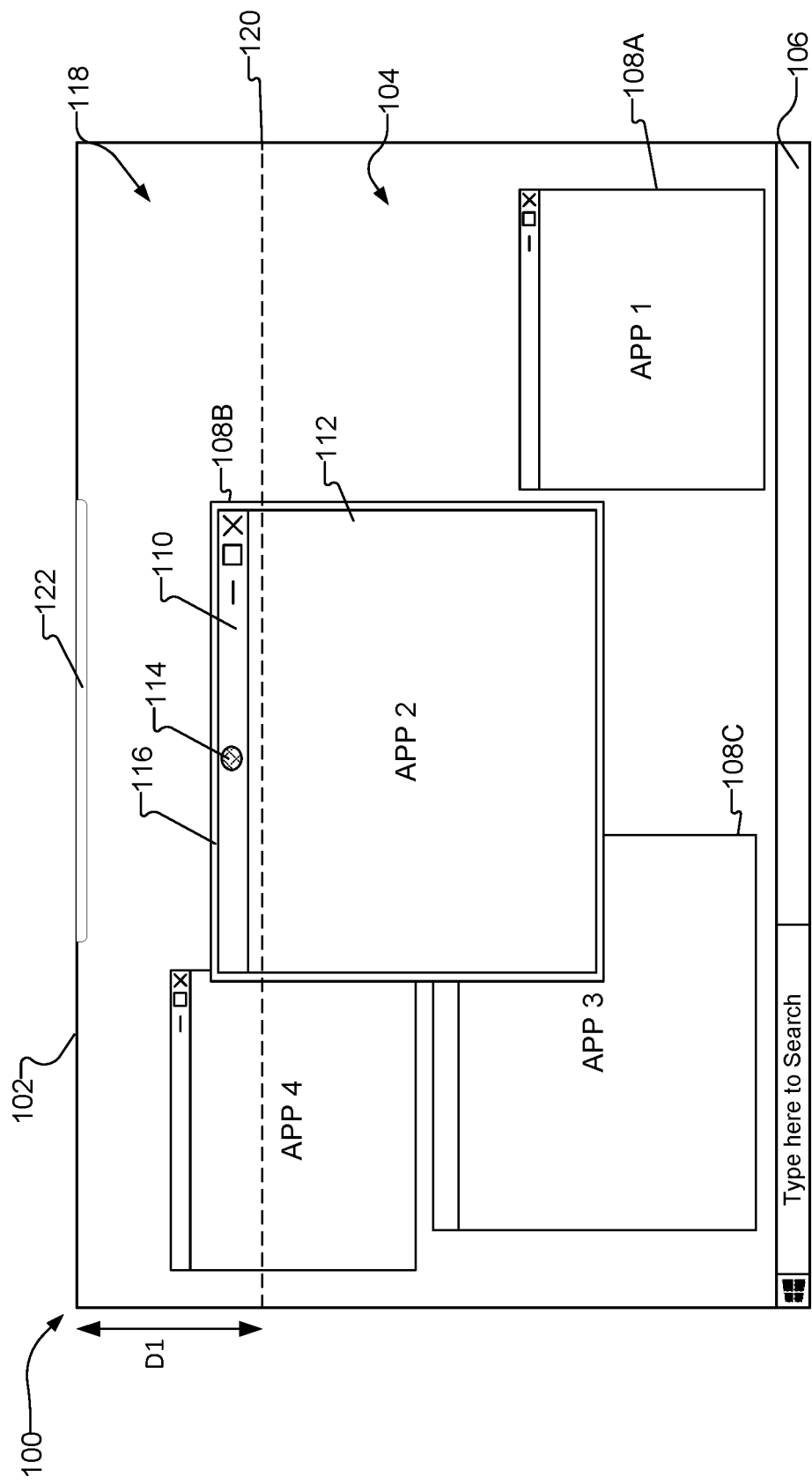
FIG. 3 depicts the example display with the particular application window dragged into a first invocation region.

FIG. 3 depicts the example display 100 with second application window 108B dragged into a first invocation region 118. While the second application window 108B is primarily used in the examples discussed herein, it should be appreciated that the functionality discussed herein applies to, and would occur, through interaction of any of the other application windows 108 as well.

When the second application window 108B is dragged into the first invocation region 118, a layout-availability indicator 122 is displayed. The layout-availability indicator 122 provides a visual indication that a plurality of display layouts (discussed further below) are available if the user continues to drag the second application window 108B towards the layout-availability indicator 122. If the second application window 108B were to be dragged out of the first invocation region 118, the layout-availability indicator 122 would be removed from the display 100.

The first invocation region 118 may take a variety of forms. In the example depicted, the first invocation region 118 is a region between the border 102, specifically the top border, and a first invocation threshold 120, which in this example is a line extending parallel to the top border and offset by a first invocation-threshold distance D1 from the top border. In other examples, the first invocation region 118 may extend from one or more of the other borders, such as the left border, the right border, and/or the bottom border of the display 100 and/or desktop 104. For instance, the first invocation region 118 may extend from the inner edge (e.g., top edge) of the taskbar 106.

In yet other examples, the first invocation region 118 may not extend from one or more of the borders. For instance, the first invocation region 118 may be located within the interior of the display 100 in a predefined location such that dragging the second application window 108B into the first invocation region 118 causes the display of the layout-availability indicator 122.

In still other examples, the first invocation region 118 may be a region of the display 100 outside of a radial distance from the start or commencement of the drag input. For instance, if the drag operation starts at a first location and moves a set amount of pixels away from the first location, the layout-availability indicator 122 may be displayed and the corresponding application window may be considered to have been dragged into the first invocation region 118.

Figure 4A:
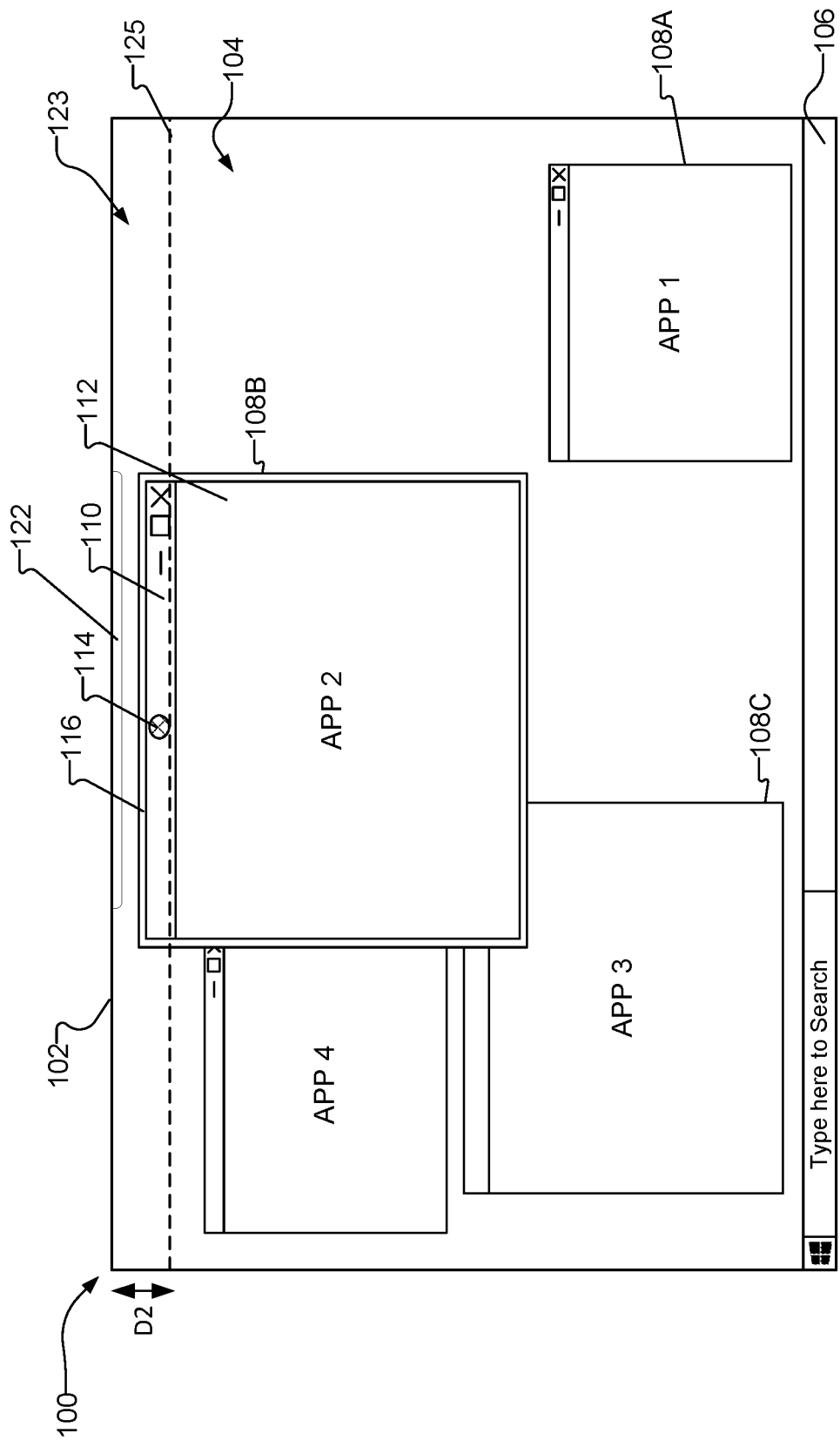
FIG. 4A depicts the example display with the particular application window dragged into a second invocation region.

FIG. 4A depicts the example display with the second application window 108B dragged into a second invocation region 123. Dragging the second application window 108B into the second invocation region 123 causes a different or additional response than the dragging of the second application window 108B into the first invocation region 118. For instance, dragging the second application window 108B in the second invocation region 123 causes a display of a layout menu, as discussed further below with respect to FIGS. 5A-5B.

In the example depicted, the second invocation region 123 is a region between the border 102, specifically the top border, and a second invocation threshold 125, which is a line extending parallel to the top border. The second invocation threshold 125 is offset from the top border by a second invocation-threshold distance D2 that is smaller than the distance D1. While the second invocation region 123 is depicted as extending from the top border, in other examples, the second invocation region 123 may extend from of the other borders of the display 100 and/or the desktop 104.

In other examples, the second invocation threshold 125 may not extend from one or more of the borders. For example, the second invocation threshold 125 may be located within the interior of the display 100 in a predefined location such that dragging the second application window 108B into the second invocation threshold 125 causes the display of the layout menu.

In still other examples, the second invocation threshold 125 may be a region of the display 100 outside of a radial distance from the start or commencement of the drag input. For instance, if the drag operation starts at a first location and moves a set amount of pixels away from the first location, the layout menu may be displayed and the corresponding application window may be considered to have been dragged into the second invocation region 125.

Figure 4B:
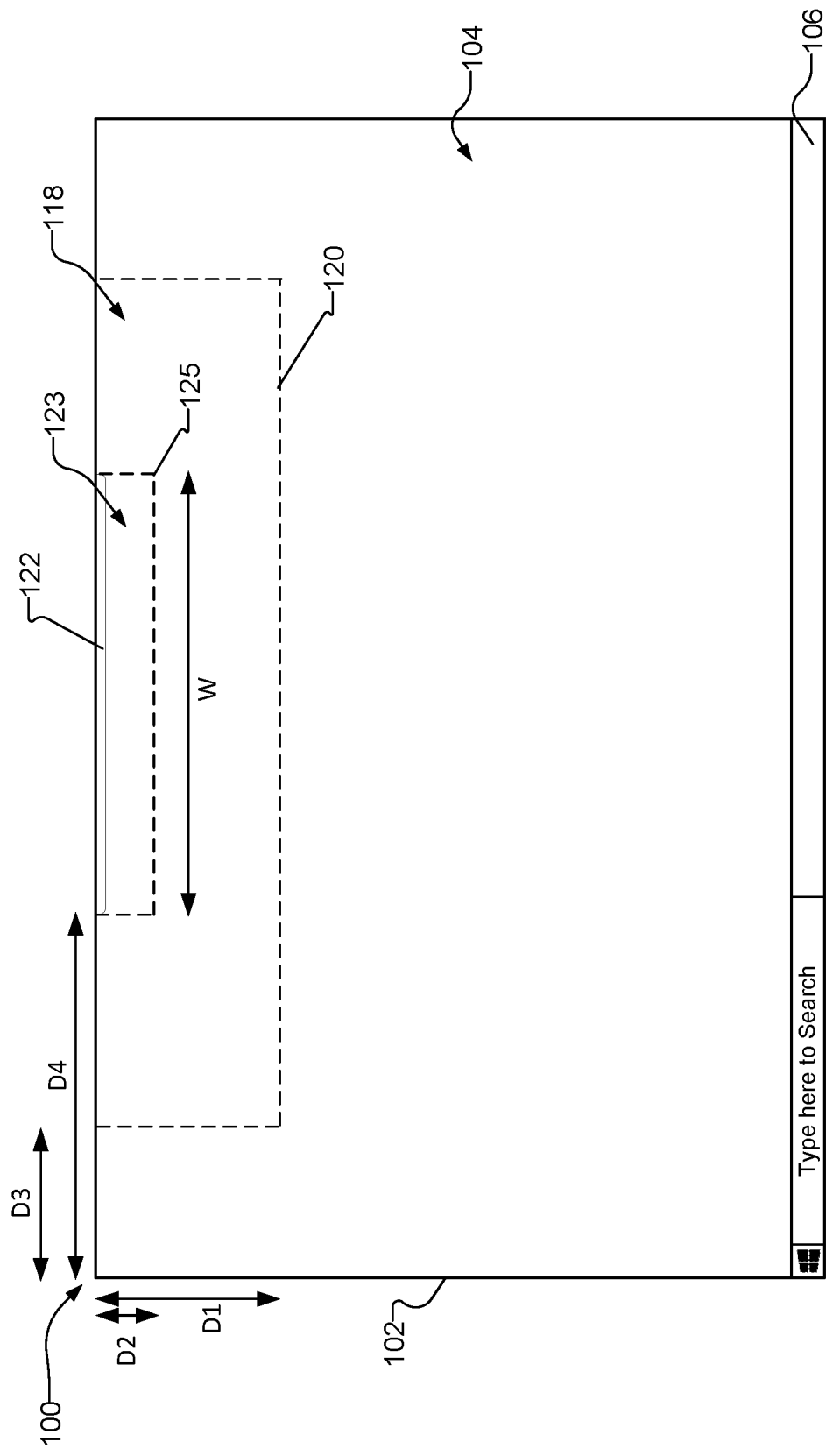
FIG. 4B depicts additional examples of the first invocation zone and the second invocation zone.

FIG. 4B depicts additional examples of the first invocation region 118 and the second invocation region 123. In the example depicted, the first invocation region 118 and the second invocation region 123 are formed as rectangular regions extending from the border 102. The first invocation region 118 is defined by the first invocation threshold 120, which is offset from a first border (e.g., the top border) by the distance D1 and is also offset from the adjacent borders (e.g., second/left border and third/right border) by a distance D3. The second invocation region 123 is defined by the second invocation threshold 125, which is offset from the first border (e.g., the top border) by the distance D2 and is also offset from the adjacent borders (e.g., second/left border and third/right border) by a distance D4. The distance D4 is greater than the distance D3. The second invocation threshold 125 may have a width W that is substantially the same as the layout-availability indicator 122. As such, the layout-availability indicator 122 may provide a visual indication of at least some of the boundaries of the second invocation region 123.

The timing of responses to dragging an application window 108 into the second invocation region 123 may also be dependent on where in the second invocation region 123 the application window is dragged. For example, if the application window 108 is dragged onto the layout-availability indicator 122, the layout menu may be immediately displayed (e.g., displayed in direct response to the application window 108 being dragged onto the layout-availability indicator 122). In contrast, if the application window 108 is dragged into the second invocation region 123, but not onto the layout-availability indicator 122, the layout menu may be displayed after a set delay period as long as the application window 108 remains in the second invocation region 123. For example, if during the drag operation, the application window 108 remains in the second invocation region 123 for 1500 ms, the layout menu is displayed.

Figure 5A:
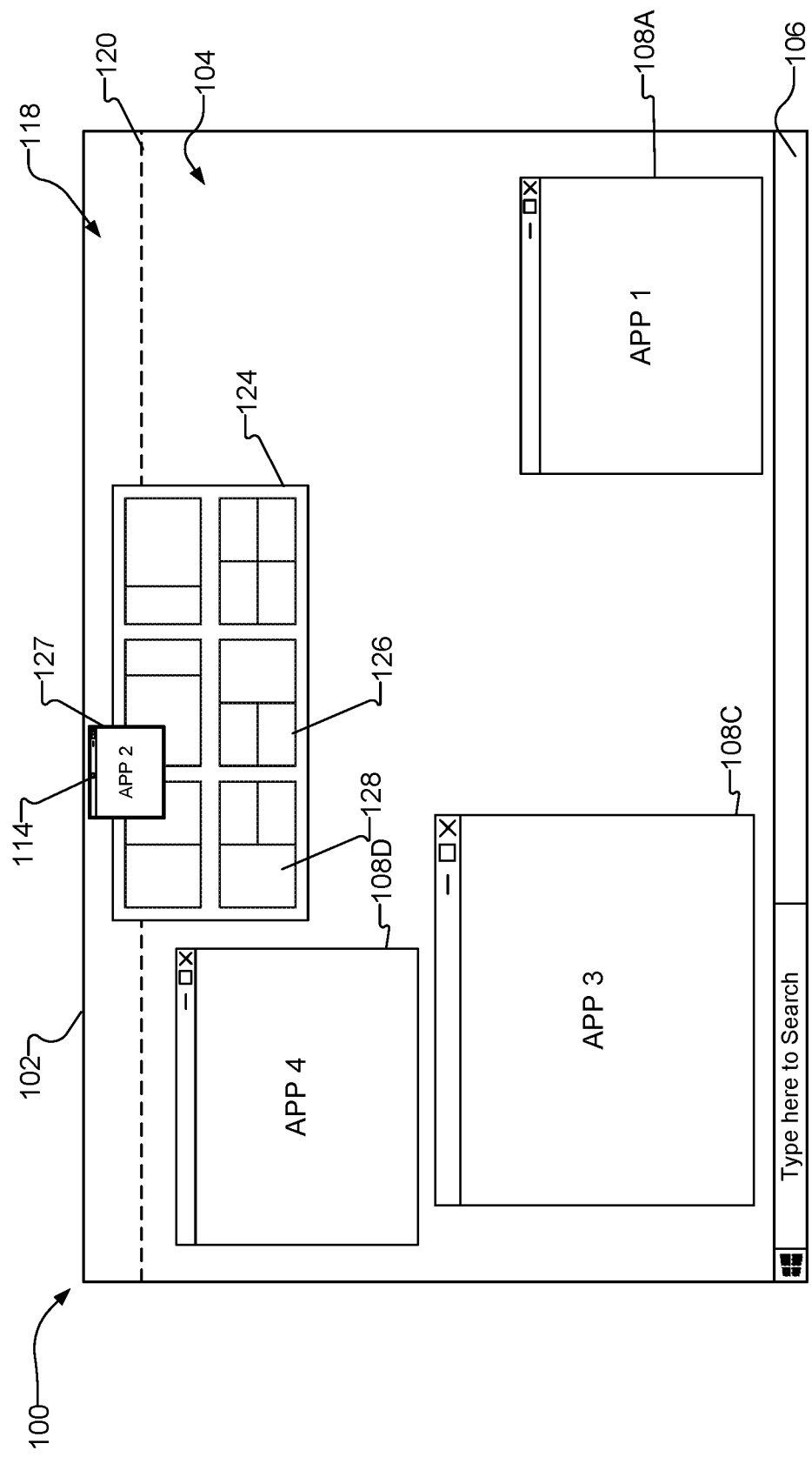
FIG. 5A depicts the example display with a layout menu of a plurality of display layouts.

FIG. 5A depicts the example display 100 with a layout menu 124 of a plurality of display layouts 126. As discussed above, when the second application window 108B is dragged into the second invocation region 123 for the set delay period and/or is dragged onto the layout-availability indicator 122, the display of the layout menu 124 is triggered. The layout menu 124 includes a plurality of different display layouts 126. Each of the display layouts 126 includes a plurality of different snap zones 128. Examples of the display layouts 126 and the snap zones 128 are discussed further below with respect to FIG. 5B.

In addition to causing the display of the layout menu 124, dragging the second application window 108B into the second invocation region 123 may also cause the second application window 108B to shrink to a miniaturized representation 127 of the second application window 108B. The miniaturized representation 127 is easier to drag by the user and also allows for better selectivity of the different snap zones of the display layouts 126. In addition, the miniaturized representation 127 occludes less of the layout menu 124 than the full second application window 108B.

The miniaturized representation 127 may be displayed in front of the layout menu 124. In turn, the layout menu 124 may be displayed in front from the remaining application windows 108, the desktop 104, and/or the taskbar 106 (where applicable). In some examples, the layout menu 124 may be displayed as a flyout from the border on which the layout-availability indicator 122 was displayed. Display of the layout menu 124 may also cause the cessation of the display of the layout-availability indicator 122. In other words, the layout-availability indicator 122 may be removed from display upon display of the layout menu 124.

Figure 5B:
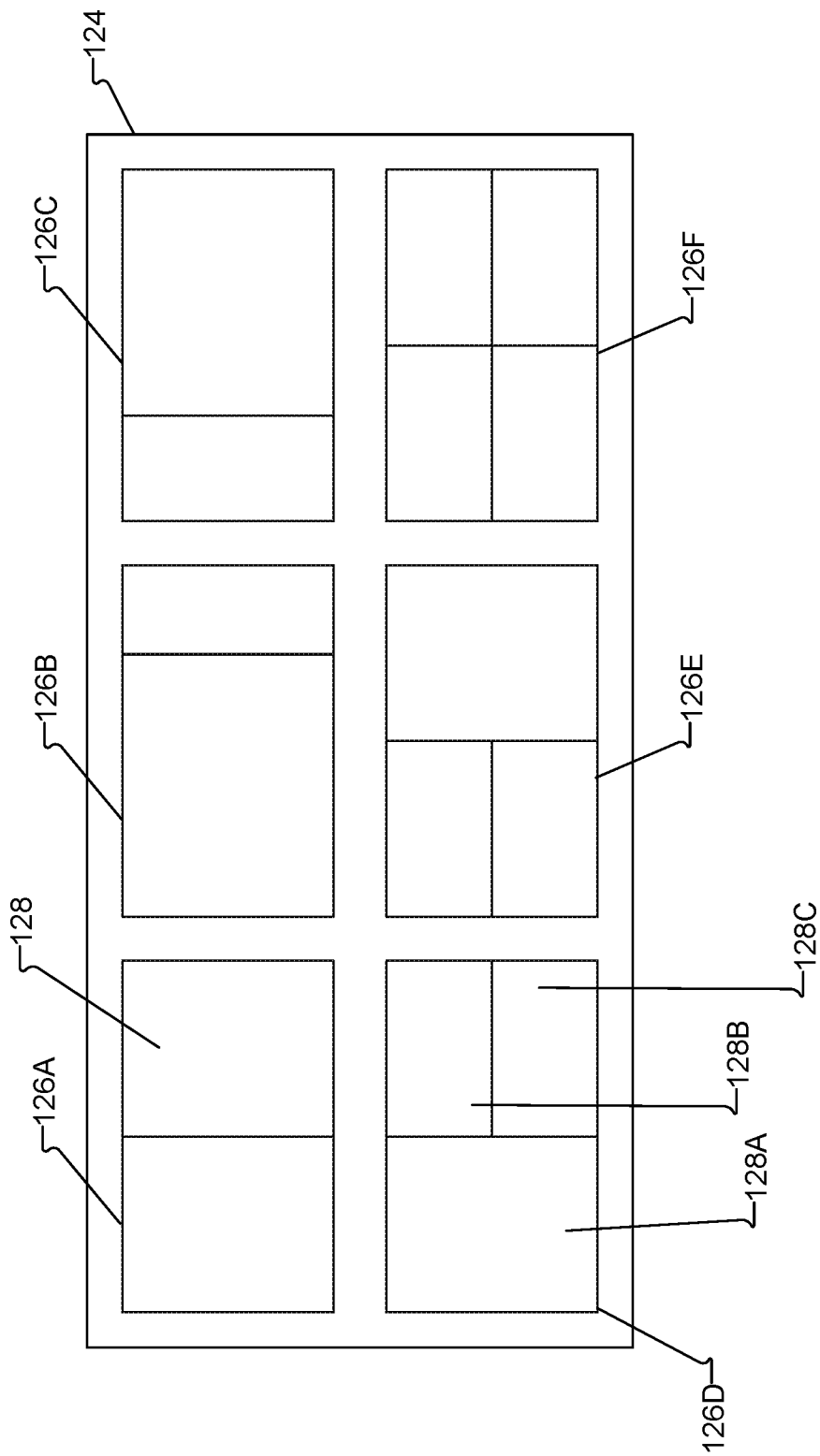
FIG. 5B depicts an example of the layout menu with the plurality of display layouts.

FIG. 5B depicts an example of the layout menu 124 with the plurality of display layouts 126. The example layout menu 124 includes 6 different display layouts 126—a first display layout 126A, a second display layout 126B, a third display layout 126C, a fourth display layout 126D, a fifth display layout 126E, and a sixth display layout 126F.

Each of the different display layouts 126 include a plurality of snap zones 128. The snap zones 128 represent zones of the display for which different application windows may fill. The snap zones 128 for each different display layout 126 may vary in size, position, and number. The snap zones 128 for display layout 126 may also be configured such that when populated with application windows, the entire area of the display 100 and/or desktop 104 is filled or substantially filled (e.g., greater than 95% of the display area and/or desktop is occupied by application windows filling the snap zones). For instance, the area available for display of application windows (e.g., within the border 108 and above or interior to the taskbar 106) is substantially filled when populated with application windows. Accordingly, each of the display layouts 126 represent the display, and each of the snap zones 128 represent the size and position of an application window.

As an example, the first display layout 126A includes two equally sized and spaced snap zones 128. Accordingly, if the first display layout is selected, a first application window fills 50% of the display area and a second application windows fills the other 50% of the display area. As another example, the fourth display layout 126D includes three snap zones 128—a first snap zone 128A, a second snap zone 128B, and a third snap zone 128C. The first snap zone 128A fills the entire height of the display area and 50% of the width of the display area. The second snap zone 128B fills 50% of the height of the display area and 50% of the width of the display area. The second snap zone 128B is positioned in the upper right-hand quadrant of the display area. The third snap zone 128C fills 50% of the height of the display and 50% of the width of the display area. The third snap zone 128C is positioned in the lower right-hand quadrant of the display area.

In some examples, multiple displays may be connected to the computing device and the desktop may extend across the multiple displays. In such examples, the display layouts 126 may be for a single display or for more than one of the multiple displays. For instance, a single display layout 126 may include snap zones that fill all the available displays over which the desktop extends.

The display layouts 126 and/or the snap zones 128 therein may be generated based on the display characteristics of the display(s). In addition, a quantity of display layouts 126 displayed in the layout menu 124 may also be based on the display characteristics. The display characteristics may include: a number of display devices (e.g., a single display, two displays), an arrangement of the display devices (e.g., two displays arranged horizontally size-by-side, three displays vertically stacked, four displays in two rows and two columns), an orientation of each display (e.g., a landscape (horizontal) orientation, portrait (vertical) orientation, diagonal orientation), a size of each display (e.g., 24 inches, 27 inches, 32 inches, 49 inches), a display resolution/aspect ratio of each display (e.g., a High Definition (HD) resolution of 1360 (width)×768 (height) pixels in a 16:9 aspect ratio; a Full High Definition (FHD) resolution of 1920 (width)× 1080 (height) pixels in a 16:9 aspect ratio; a Quad HD (QHD) resolution of 2560 (width)×1440 (height) pixels in a 16:9 aspect ratio), and/or the like.

As an example, the display layouts 126 depicted in FIG. 5B are generated for a display that is in a landscape orientation. If the display were rotated to a portrait orientation, different display layouts 126 would be generated. For instance, the first display layout 126A may have the two snap zones 128 displayed as above and below one another rather than side by side as depicted in FIG. 5B. As another example, the display layouts 126 in FIG. 5B may be for a display that is 24 or 27 inches. Different display layouts 126 may be generated for an ultrawide monitor (e.g., 49-inch monitor). For instance, the first display layout 126A may have three equally sized and spaced snap zones 128 instead of two snap zones 128 as depicted in FIG. 5B. In addition, the quantity of display layouts 126 may also increase with the size of the display. For instance, four or fewer display layouts 126 may be generated for smaller displays (e.g., 24 inch or smaller) and six or more display layouts 126 may be generated for larger displays (e.g., 32 inch or greater). Because the larger displays have additional area or real estate for application windows, additional combinations of snap zones 128 may be possible which results in additional display layouts 126 being generated.

In some examples, the display layouts 126 and/or the snap zones 128 therein may be generated based on contextual information and/or application characteristics. The contextual information and/or application characteristics may include information related to applications that are currently running; windows that are currently open on a screen; a Z-order of the open windows overlapping each other on the current screen; most recently used applications, files, websites, etc.; most frequently used applications; applications that were recently grouped together to form one or more on-screen windows arrangements; applications that were frequently grouped together to form one or more on-screen windows arrangements; applications that have not been grouped together or rarely grouped together in the previously generated on-screen windows arrangements; applications that have similar titles and/or are associated with similar keywords, a user's implicit or explicit feedback on grouping, sizing and positioning applications; websites or files that the user has recently or frequently opened; developer or administrator-provided information specifying or suggesting a plurality of applications to be grouped together, a size and position of each application in the group, etc.; and/or the like.

In some examples, application characteristics may also include characteristic sizes of the running applications. For instance, the calculator application is typically run in a smaller window than a presentation or word-processing application. Such characteristic sizes may be used when generating the different display layouts 126 and/or the snap zones 128 therein. Additional uses for and discussion of contextual information is provided in U.S. patent application Ser. No. 17/123,052, titled Automated On-Screen Windows Arrangements, and filed on Dec. 15, 2020, the entirety of which is incorporated herein by reference.

Figure 6:
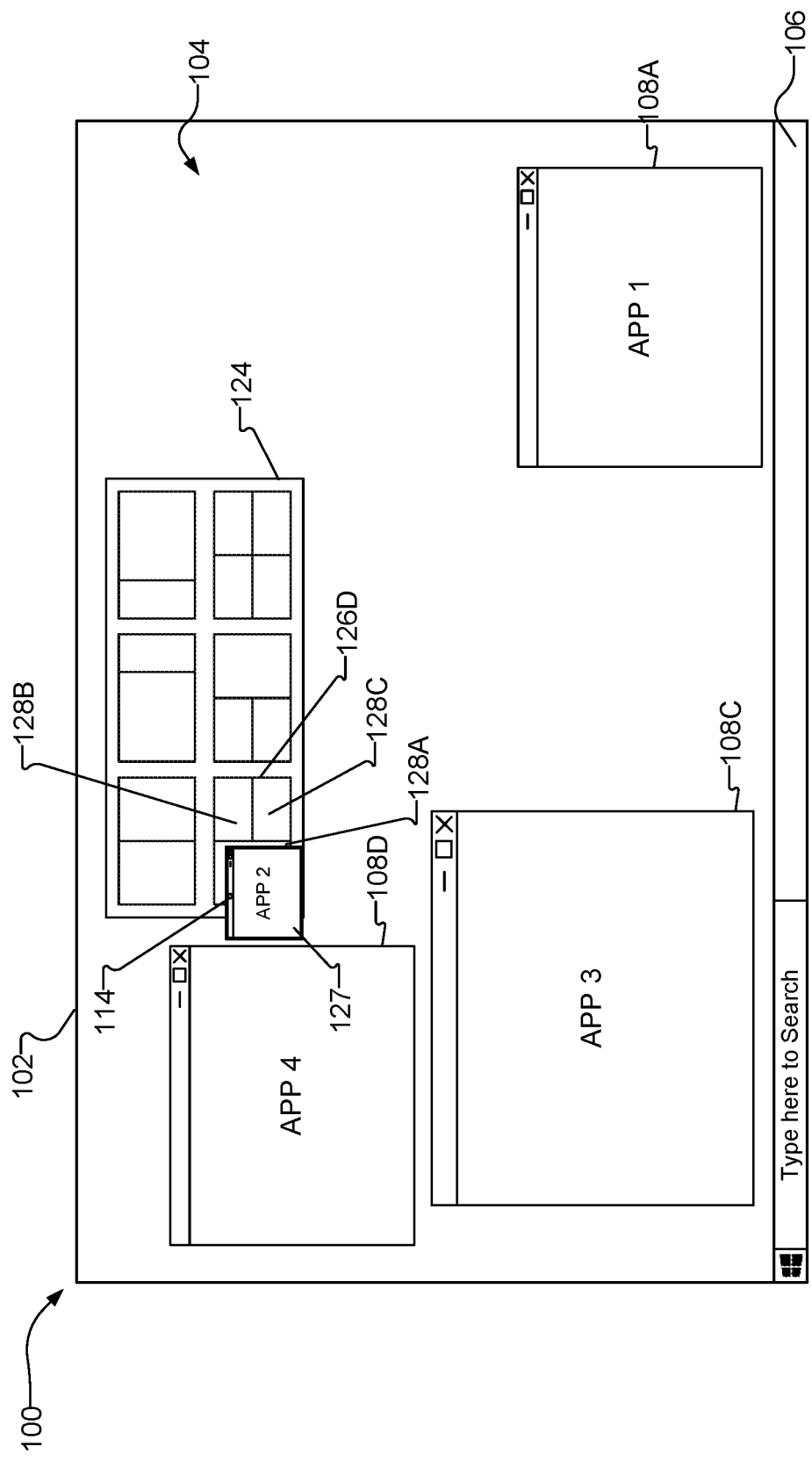
FIG. 6 depicts the particular application window being dragged over a particular snap zone of a display layout.

FIG. 6 depicts the miniaturized representation 127 of the second application window 108B being dragged over the first snap zone 128A of the fourth display layout 126D displayed in the layout menu 124. The miniaturized representation 127 may be dragged and moved over different snap zones 128 of the display layouts 126 displayed in the layout menu 124. When the miniaturized representation 127 is dragged or hovered over a particular snap zone 128, a zone-indicator pane may be displayed corresponding to the particular snap zone 128.

Figure 7:
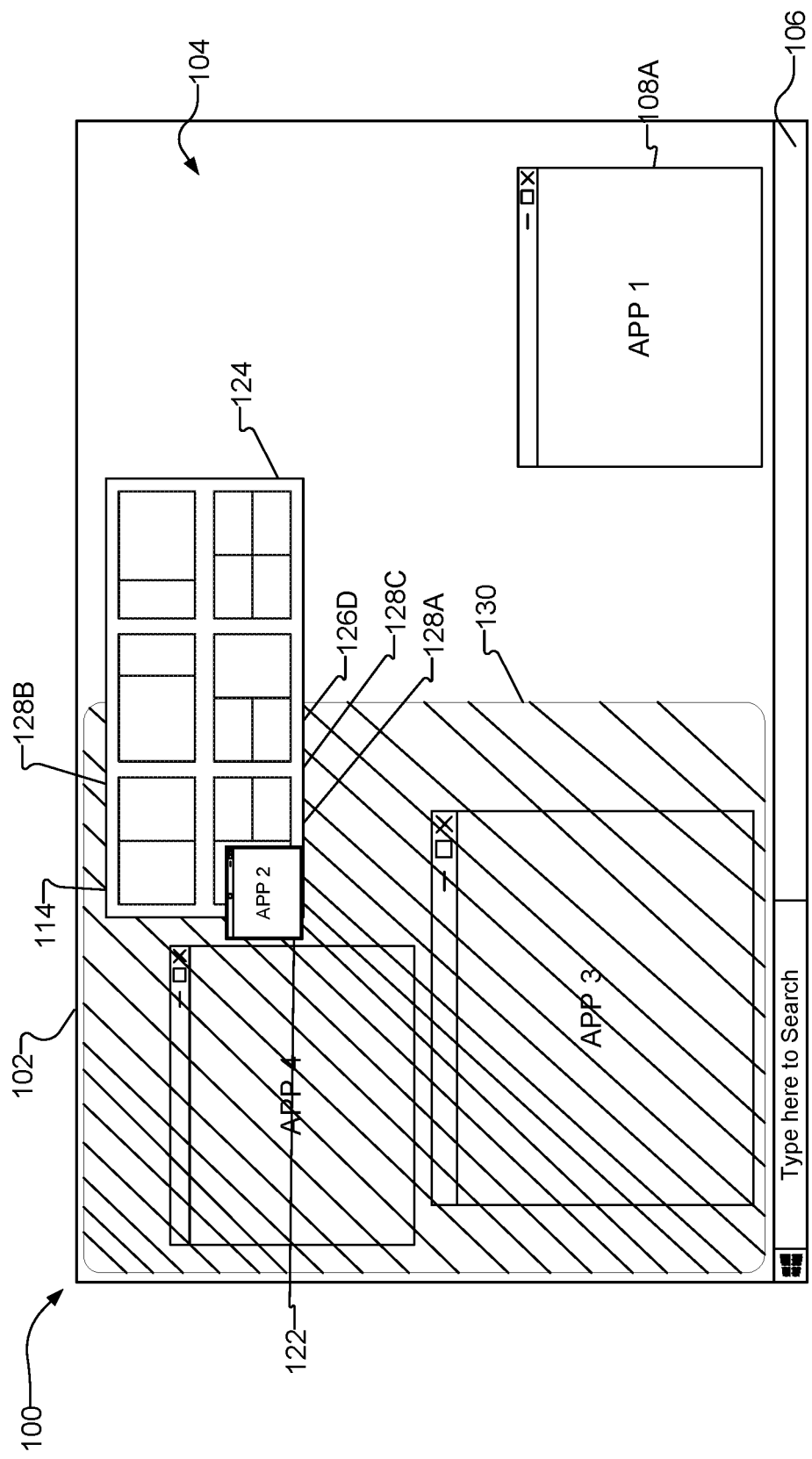
FIG. 7 depicts an example of the display with a zone-indicator pane.

FIG. 7 depicts an example of the display 100 with a zone-indicator pane 130 corresponding to the first snap zone 128A of the fourth display layout 126D. The zone-indicator pane 130 corresponds to the size, shape, and position of the first snap zone 128A. For instance, the first snap zone 128A indicates filling the height of the display 100 and filling 50% of the width of the display 100 with an application window. Accordingly, the zone-indicator pane 130 fills the height of the display 100 and 50% of the width of the display 100. The zone-indicator pane 130 provides a live preview of the space on the screen which the second application window 108B would fill if the first snap zone 128A was selected.

The zone-indicator pane 130 may have a variety of different forms. In the example depicted, the zone-indicator pane 130 is a rectangular pane located in front of the other application windows 108 but behind the layout menu 124 and the miniaturized representation 127. The zone-indicator pane 130 may be partially transparent to the desktop 104 and the application windows 108 behind the zone-indicator pane 130. In other examples, the zone-indicator pane 130 shows a live preview of the second application window 108B filling the space of the display 100 corresponding to the hovered-over snap zone 128 (e.g., the first snap zone 128A in this example).

In another example, when the miniaturized representation 127 is hovered or dragged over a particular snap zone 128, the miniaturized representation 127 may fill the snap zone within the layout menu 124 to provide a miniaturized preview. Such a miniaturized preview may be in addition or alternatively to the zone-indicator pane 130.

When the miniaturized representation 127 is dropped (e.g., the touch input is released) over a particular snap zone 128, the particular display layout 126, in which the particular snap zone 128 is presented, is selected. For instance, if the miniaturized representation 127 is dropped on the first snap zone 128A, the fourth display layout 126D is selected. In addition, the second application window 108B is resized and repositioned accordingly the first snap zone 128A.

Figure 8:
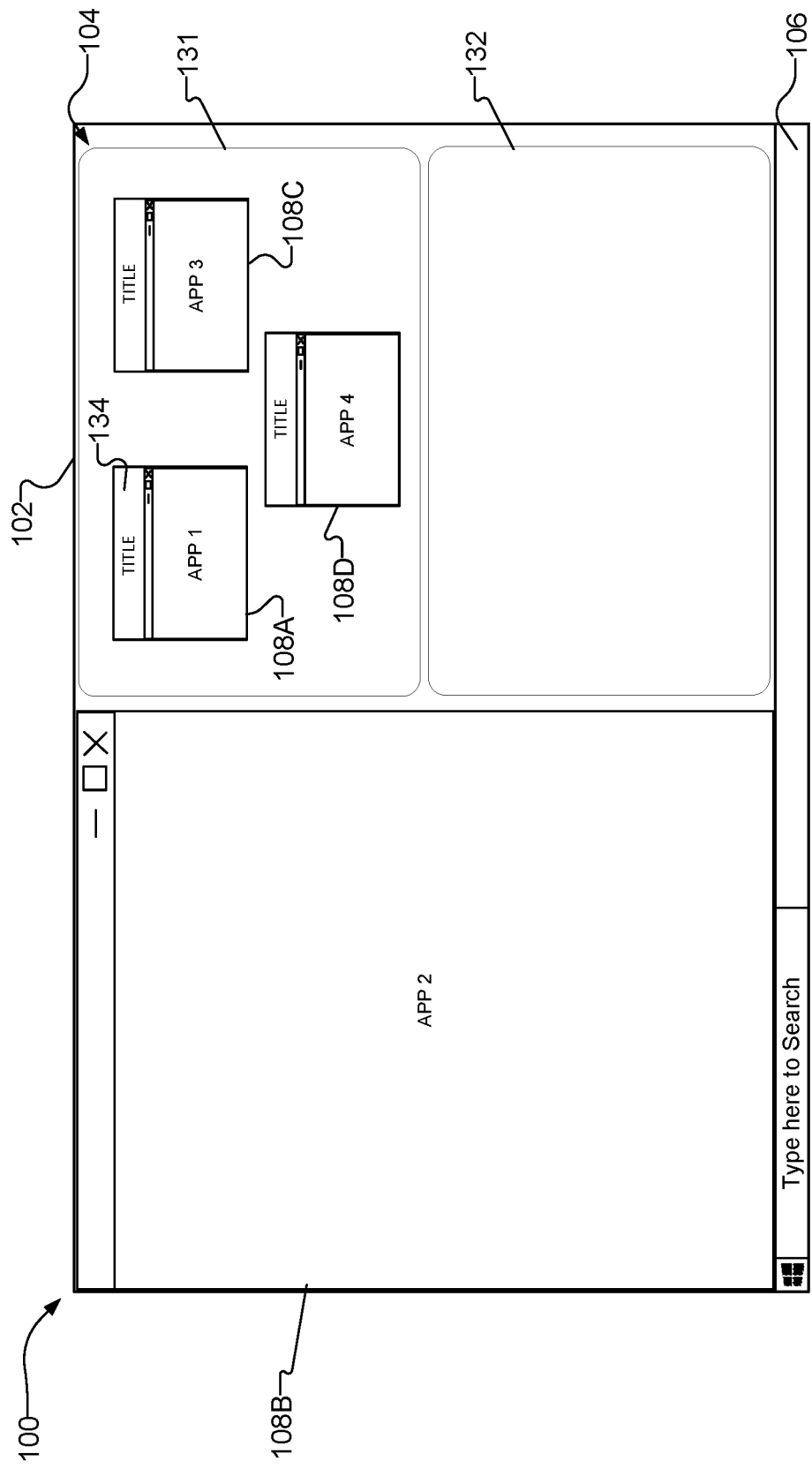
FIG. 8 depicts an example of the display with a resized, repositioned particular application window and two pending zone indicators.

FIG. 8 depicts an example of the display with a resized, repositioned second application window 108B and two pending zone indicators—a first pending-zone indicator 131 and a second pending-zone indicator 132. The first pending-zone indicator 131 and the second pending-zone indicator 132 correspond to the remaining snap zones 128 in the selected display layout 126. In the example depicted, the first pending-zone indicator 131 corresponds to the size and position of the second snap zone 128B of the selected fourth display layout 126D, and the second pending-zone indicator 132 corresponds to the size and position of the third snap zone 128C of the selected fourth display layout 126D.

The pending-zone indicators 131, 132 provide for a guided snap assist process that fills the remaining portions of the display 100 with application windows 108. For example, the first pending-zone indicator 131 may include representations of the remaining application windows 108 other than the second application window 108B, which was filled in the space of the display corresponding to the selected first snap zone 128A. For instance, in the example depicted, representations of the first application window 108A, the third application window 108C, and the fourth application window 108D are displayed in the first pending-zone indicator 131. Each of the representations may also include a window title segment 134 displayed outside the application windows 108. The window title segment 134 displays the title of the corresponding application window 108. The title of the application window 108 may be a title of the document open in the application window 108, a webpage title open in the application window 108, etc.

Selection of one of the representations of the application windows 108 in the first pending-zone indicator 131 causes the selected application window to be resized and repositioned to fill the first pending-zone indicator 131. For example, the first application window 108A may be selected, which causes the first application window 108A to fill the space of the display 100 occupied by the first pending-zone indicator 131.

In some examples, representations of non-active applications or application windows may also be displayed in in the pending-zone indicator 131 in addition or alternatively to the representations of the active or running application windows 108. The non-active applications may be selected in a variety of ways. For instance, the applications may be selected based on frequency of use (e.g., most frequently used applications and/or applications frequently used with the active applications), recently closed applications, common applications, etc.

Figure 9:
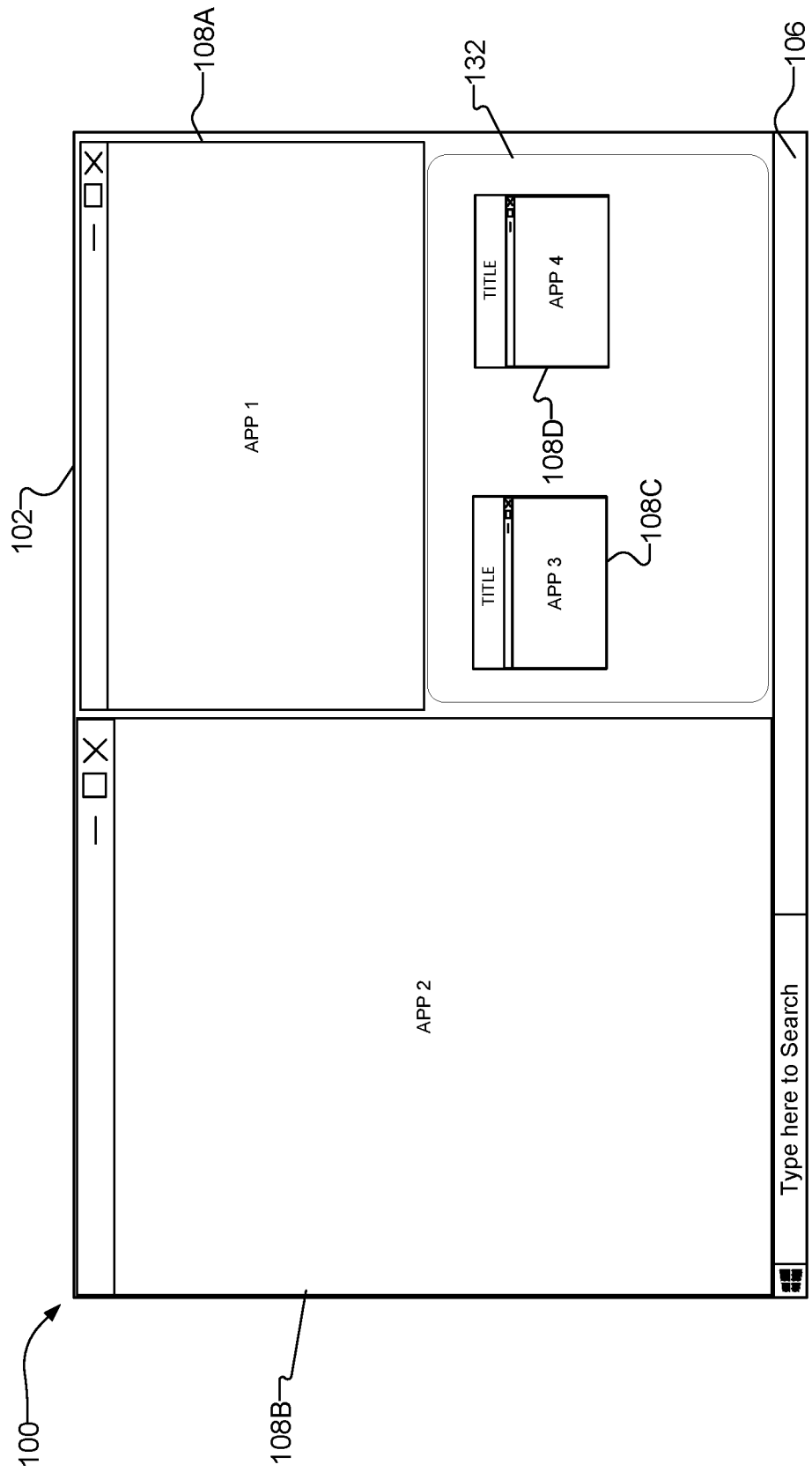
FIG. 9 depicts an example of the display with one of the pending zone indicators filled with a selected application window.

FIG. 9 depicts an example of the display 100 with the first pending-zone indicator 131 filled with the selected first application window 108A. As can be seen from FIG. 9, the first application window 108A has been resized and repositioned according to the first pending-zone indicator 131 and/or the second snap zone 128B.

Representations of the remaining unselected application windows 108 are then displayed in the second pending-zone indicator 132. In the example depicted, representations for the third application window 108C and the fourth application window 108D may be displayed within the second pending-zone indicator 132.

Selection of one of the representations of the application windows 108 causes the selected application window to be resized and repositioned to fill the second pending-zone indicator 132. For instance, the third application window 108C may be selected, which causes the third application window 108C to fill the space of the display 100 occupied by the second pending-zone indicator 132.

While the pending-zone indicators 131, 132 are show as being sequentially populated with the remaining application windows 108, in some examples, the pending zone-indicators 131, 132 are concurrently populated with representations of the application windows. As an example, when one of the application windows 108 is selected to populate the first pending-zone indicator 131, that particular application window is removed from possible selection from the second-pending zone indicator 132.

Figure 10:
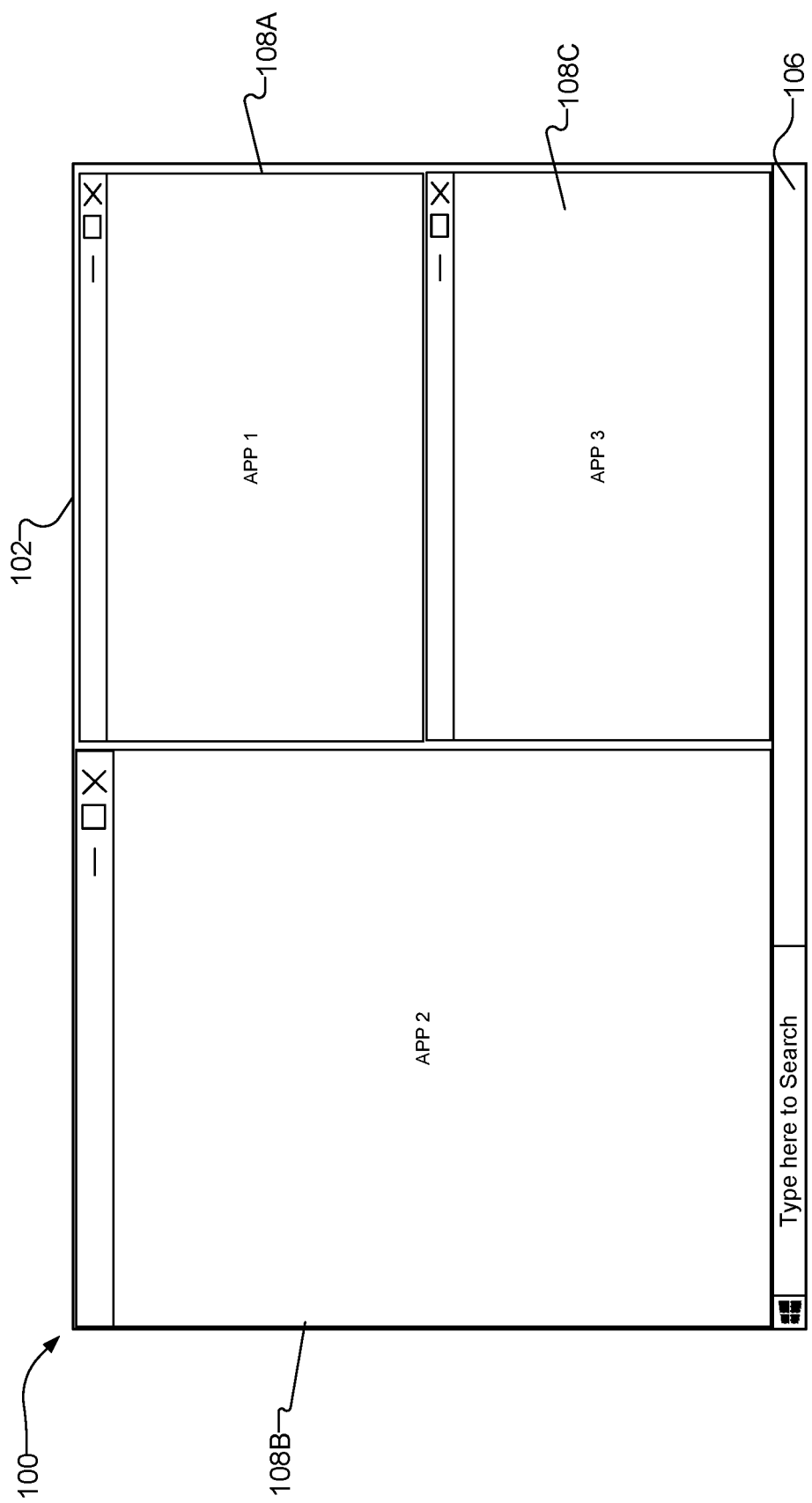
FIG. 10 depicts an example of the display with all the pending zone indicators filled with selected application windows.

FIG. 10 depicts an example of the display 100 with the second pending-zone indicator 132 filled with the selected third application window 108C. As can be seen from FIG. 10, the third application window 108C has been repositioned and resized according to the second pending-zone indicator 132 and/or the third snap zone 128C. At this point, the application windows 108 of the display 100 have been reconfigured to more efficiently utilize the available real estate of the display 100.

In some examples, the user may modify the selected layout of snaps zones during the guided assist phase of displaying and populating the pending-zone indicators 131, 132. For example, user interface elements, such as a close or deselect option, may be displayed in one or more of the pending-zone indicators 131, 132 to allow the user to dismiss or deselect one or more of the pending-zone indicators 131, 132. In response to dismissing a pending-zone indicator, the remaining pending-zone indicators and/or already displayed/filled application windows may be resized and/or rearranged. For example, with reference to FIG. 8, if the second pending-zone indicator 132 were dismissed or closed, the first pending-zone indicator 131 may expand to fill the space of the second pending-zone indicator 132. If both the first pending-zone indicator 131 and the second pending-zone indicator 132 are dismissed, the second application window 108 may expand to fill the entire display area.

In still other examples, one or more of the pending-zone indicators 131, 132 may be automatically filled (e.g., with no additional user interaction or input) with application windows 108 that are already open. For instance, where there the remaining application windows 108 available to fill the pending-zone indicators is less than or equal to the number of remaining pending-zone indicators, the pending-zone indicators may be automatically filled.

Figure 11A:
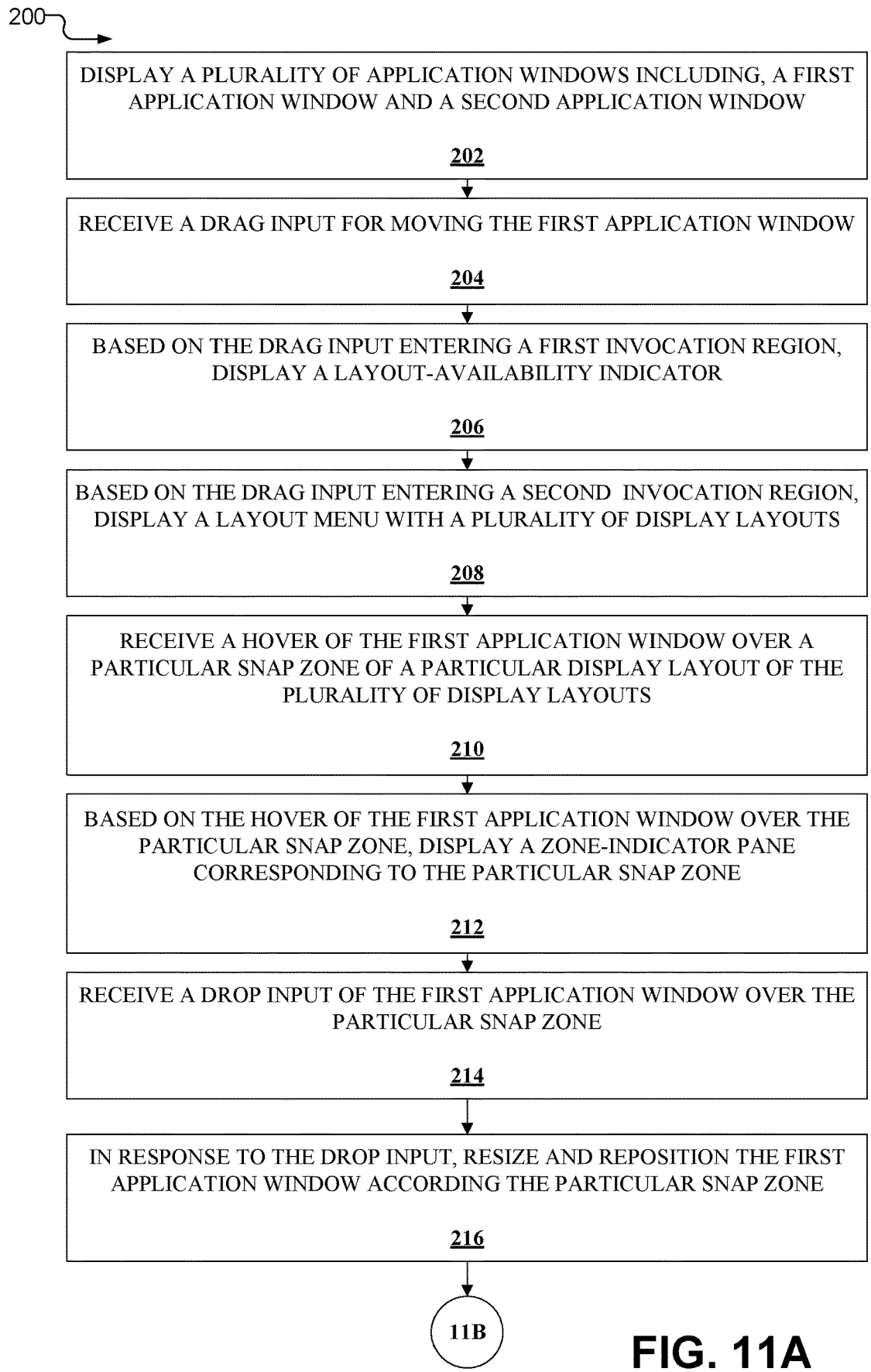
FIGS. 11A-B depict an example method for reconfiguring application windows in a display.
Figure 11B:
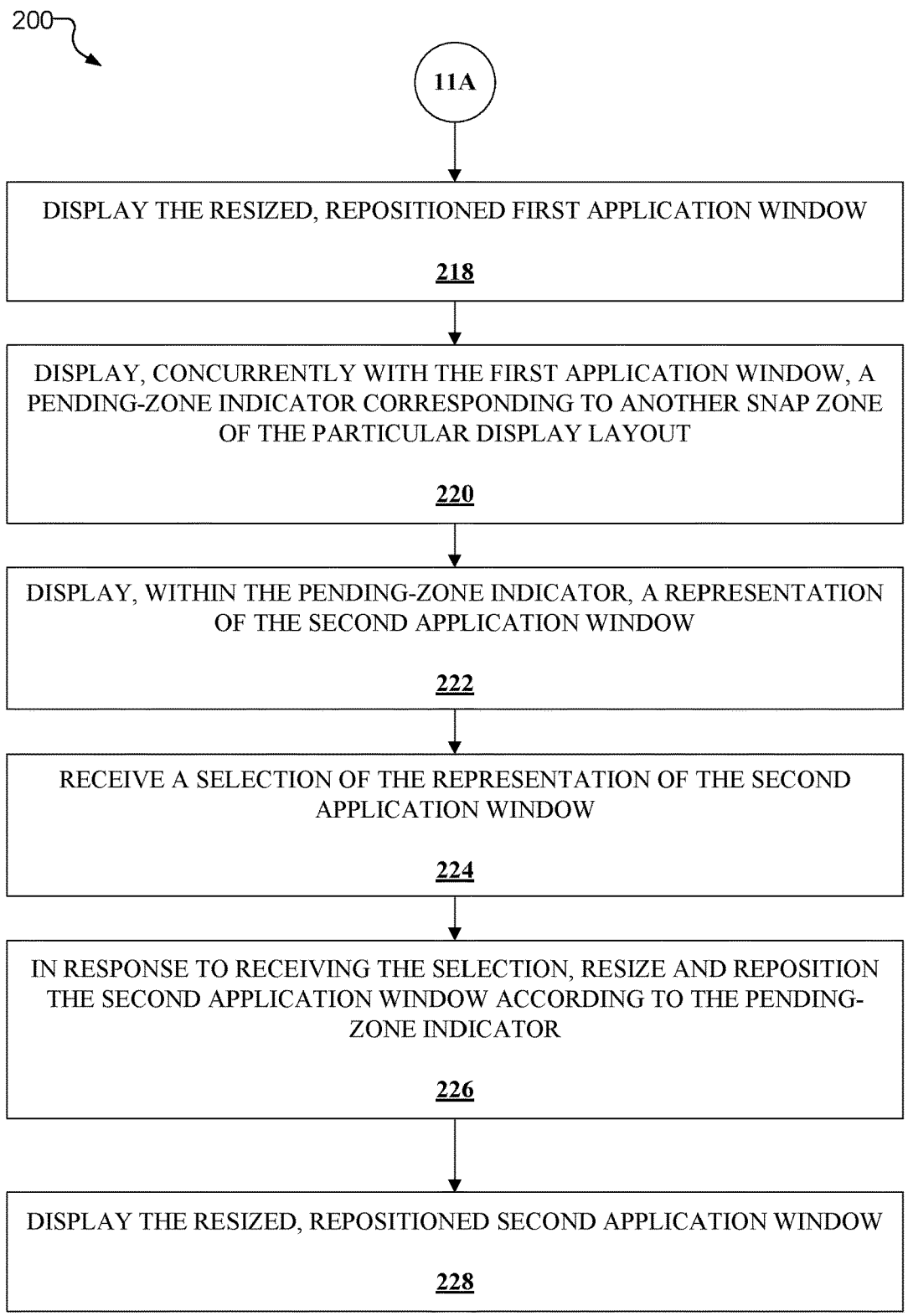

FIGS. 11A-B depict an example method 200 for reconfiguring application windows in a display. At operation 202, a plurality of application windows are displayed on a display. The plurality of application windows may be displayed in a desktop and the control of the display of the application windows may be controlled by the operating system of the computing device to which the display is connected. The plurality of application windows includes a first application window and a second application window.

At operation 204, a drag input is received for moving the first application window. For example, the drag input may include receiving a touch input on the title bar of the first application window and a sliding motion across the screen. The drag input may move the first application window to different positions in the display, such as to a first invocation region and/or a second invocation region.

At operation 206, based on the drag input entering the first invocation region, a layout-availability indicator may be displayed. The layout-availability indicator may be displayed within the first invocation region. The drag input may continue from the first invocation region to the second invocation region, which may be located within the boundary of the first invocation region.

At operation 208, based on the drag input entering the second invocation region, a layout menu is displayed. The layout menu may be displayed immediately when the drag input enters the boundary of the layout-availability indicator. Where the drag input enters the second invocation region, but is still outside the boundary of the layout-availability indicator, the layout menu may be displayed after a set delay period. The layout menu may be displayed as a flyout from one of the borders of the display.

The layout menu includes a plurality of display layouts and each of the display layouts includes multiple snap zones sized and positioned in different manners across the display layouts. The display layouts and/or the snap zones displayed within the display layouts may be generated based on the display characteristics, contextual information, and/or application characteristics of the running applications.

Concurrently with the display of the layout menu, the first application window may be converted to a miniaturized representation of the first application window. The miniaturized representation still remains within the drag input such that the user may continue to drag the miniaturized representation over the layout menu.

At operation 210, a hover of the first application window (e.g., the miniaturized representation of the first application window) over a particular snap zone of a particular display layout in the layout menu is received. At operation 212, based on the hover of the first application window over the particular snap zone, a zone-indicator pane is displayed. The zone-indicator pane is positioned and sized according to the particular snap zone.

At operation 214, a drop input of the first application window over the particular snap zone is received. The drop input may be a release of the input, such as removing a finger from the touch-screen display or releasing a button of a mouse. At operation 216, in response to receiving the drop input, the application window is resized and repositioned according to the particular snap zone. At operation 218, the resized, repositioned first application window is displayed.

At operation 220, a pending-zone indicator is displayed concurrently with the resized, repositioned first application window. The pending-zone indicator corresponds to, and is sized and positioned according to, another snap zone of the display layout for which the particular snap zone was selected via the drop input. At operation 222, a representation of the second application window is displayed within the pending-zone indicator.

At operation 224, a selection of the representation of the second application window is received. At operation 226, in response to receiving the selection, the second application window is resized and repositioned according to the pending-zone indicator. For example, the second application window may be resized and repositioned to fill the pending zone-indicator. At operation 228, the resized, repositioned second application window is displayed. The resized, repositioned second application window is displayed concurrently with the resized, repositioned first application window.

Figure 12:
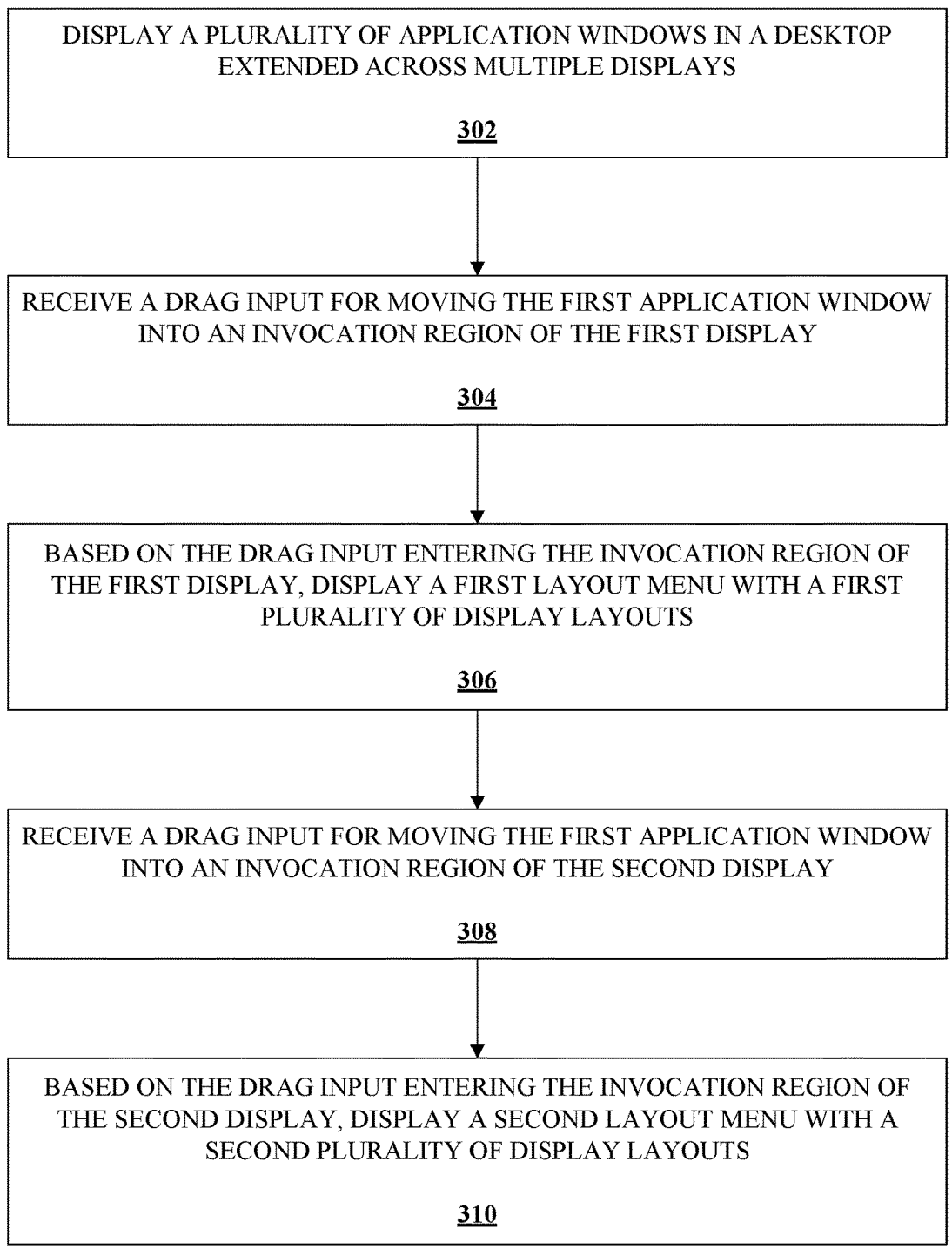
FIG. 12 depicts an example method for reconfiguring application windows in multiple displays.

FIG. 12 depicts an example method 300 for reconfiguring application windows in multiple displays. At operation 302, a plurality of application windows (e.g., a first application window and a second application window) are displayed in a desktop that extends across multiple displays (e.g., a first display and a second display). The first display has display characteristics that are different from the display characteristics of the second display.

At operation 304, a drag input is received for moving the first application window into an invocation region of the first display. At operation 306, based on the drag input entering the invocation region of the first display, a first layout menu is displayed in the first display. The first layout menu includes a first plurality of display layouts with different configurations of snap zones. The first plurality of display layouts are generated based on one or more display characteristics of the first display.

At operation 308, a drag input is received for moving the first application window into an invocation region of the second display. At operation 310, based on the drag input entering the invocation region of the second display, a second layout menu is displayed in the second display. The second layout menu includes a second plurality of display layouts with different configurations of snap zones. The second plurality of display layouts are generated based on one or display characteristics of the second display. The second plurality of display layouts are different form the first plurality of display layouts. For example, the first display may be smaller than the second display, and the second plurality of display layouts may have a larger quantity of display layouts than the first plurality of display layouts. Interactions with the display layouts and/or snap zones may be provided in a similar manner as discussed above.

Figure 13:
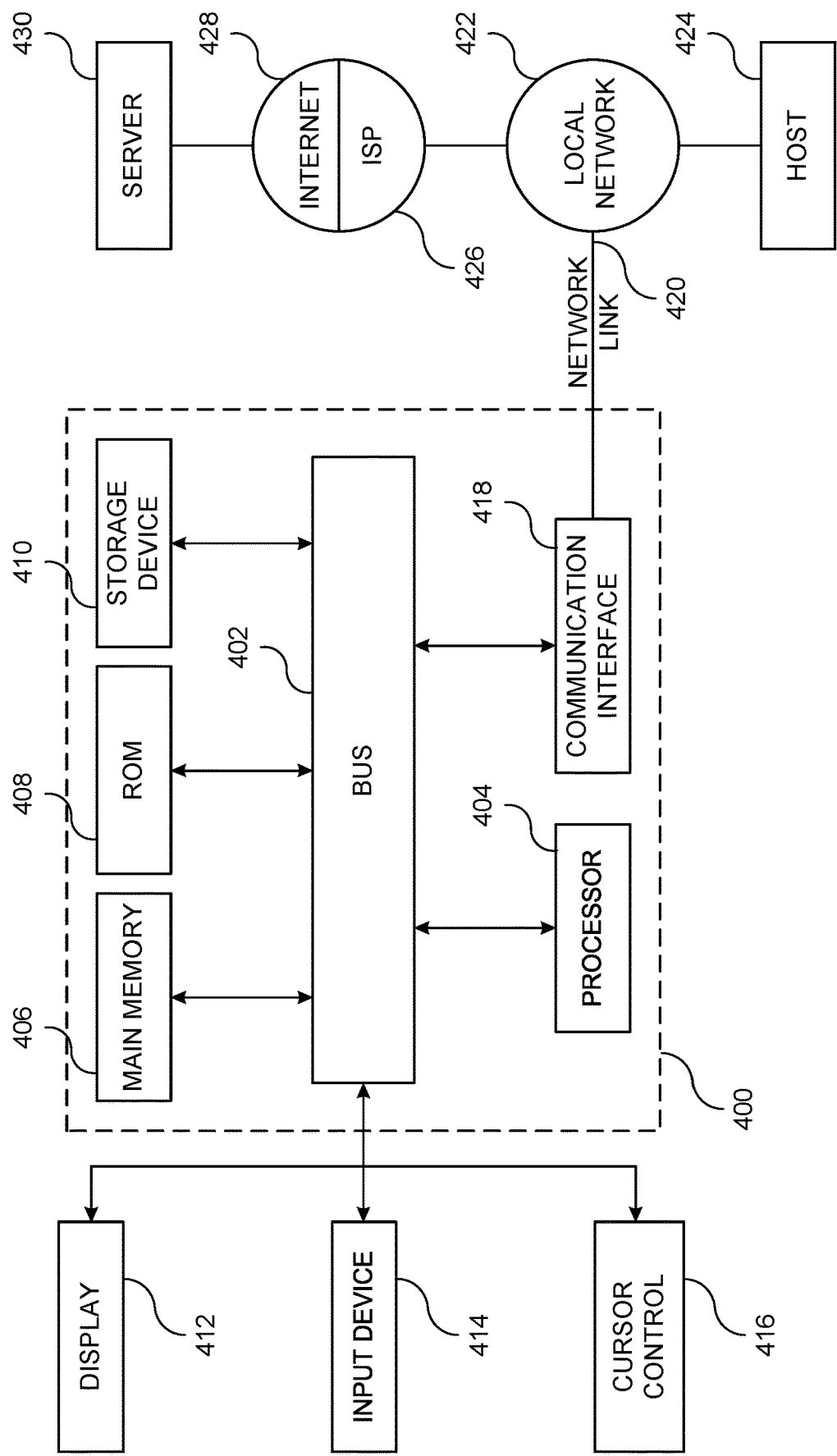
FIG. 13 depicts a block diagram showing an example computer system upon which implementations of this disclosure may be implemented.

FIG. 13 is a block diagram showing an example a computer system 400 upon which aspects of this disclosure may be implemented. The computer system 400 may include a bus 402 or other communication mechanism for communicating information, and a processor 404 coupled with the bus 402 for processing information. The computer system 400 may also include a main memory 406, such as a random-access memory (RAM) or other dynamic storage device, coupled to the bus 402 for storing information and instructions to be executed by the processor 404. The main memory 406 may also be used for storing temporary variables or other intermediate information during execution of instructions to be executed by the processor 404.

The computer system 400 may further include a read only memory (ROM) 408 or other static storage device coupled to the bus 402 for storing static information and instructions for the processor 404. A storage device 410, such as a flash or other non-volatile memory may be coupled to the bus 402 for storing information and instructions.

The computer system 400 may be coupled via the bus 402 to a display 412, such as a liquid crystal display (LCD), for displaying information. One or more user input devices, such as the example user input device 414 may be coupled to the bus 402, and may be configured for receiving various user inputs, such as user command selections and communicating these to the processor 404, or to the main memory 406. The user input device 414 may include physical structure, or virtual implementation, or both, providing user input modes or options, for controlling, for example, a cursor, visible to a user through display 412 or through other techniques, and such modes or operations may include, for example virtual mouse, trackball, or cursor direction keys among other cursor controls 416.

The computer system 400 may include respective resources of the processor 404 executing, in an overlapping or interleaved manner, respective program instructions. Instructions may be read into the main memory 406 from another machine-readable medium, such as the storage device 410. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 410. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine. As used herein, computer storage media does is a computer-readable medium that does not include transmission media. As such, computer storage media in non-transitory.

The computer system 400 may also include a communication interface 418 coupled to the bus 402, for two-way data communication coupling to a network link 420 connected to a local network 422. The network link 420 may provide data communication through one or more networks to other data devices. For example, the network link 420 may provide a connection through the local network 422 to a host computer 424 or to data equipment operated by an Internet Service Provider (ISP) 426 to access through the Internet 428 a server 430, for example, to obtain code for an application program.

As will be appreciated from the foregoing, the present technology provides for at least the following aspects and examples. In an aspect, the technology relates to a system for reconfiguring applications windows in a display. The system includes a display; a processor; and a computer-readable medium comprising instructions that, when executed by the processor, cause the processor to control the system to perform operations. The operations include displaying, on the display, a first application window and a second application window, the first application window having a title bar and a content area; receiving an input selecting the title bar of the first application window; receiving a drag input for moving the first application window; based on the drag input entering a first invocation region, displaying a layout-availability indicator; based on the drag input entering a second invocation region, displaying a layout menu with a plurality of display layouts, each of the display layouts including one or more snap zones; receiving a drop input of the first application window over a particular snap zone of a particular display layout of the plurality of display layouts; and in response to the drop input, resizing and repositioning the first application window according the particular snap zone.

In an example, the first invocation region is a first invocation-threshold distance from a border of the display. In another example, the second invocation region is a second invocation-threshold distance from a border of the display, the second invocation-threshold distance being less than the first invocation-threshold distance. In a further example, the operations further include displaying the resized, repositioned first application window; displaying, concurrently with the first application window, a pending-zone indicator corresponding to another snap zone of the particular display layout; displaying, within the pending-zone indicator, a representation of the second application window; receiving a selection of the representation of the second application window; and in response to receiving the selection, resizing and repositioning the second application window according to the pending-zone indicator. In yet another example, the representation of the second application window includes a display of a title segment including a title of the second application window.

In another example, the operations further include accessing display characteristics for the display; and generating the plurality of display layouts based on the display characteristics. In a further example, a quantity of display layouts in the plurality of display layouts is based on the display characteristics. In yet another example, arrangements of the one or more snap zones in the plurality of display layouts are based on the display characteristics. In still another example, the display characteristics include a display orientation. In still yet another example, the operations further include determining application characteristics for at least a first application of the first application window and a second application of the second application window; and generating the plurality of display layouts based on the application characteristics.

In another aspect, the technology relates to a method for reconfiguring application windows in a display. The method includes displaying a first application window and a second application window; receiving a drag input for moving the first application window; based on the drag input entering an invocation region, displaying a layout menu with a plurality of display layouts, each of the display layouts including one or more snap zones; receiving a hover of the first application window over a particular snap zone of a particular display layout of the plurality of display layouts; based on the hover of the first application window over the particular snap zone, displaying a zone-indicator pane corresponding to the particular snap zone; receiving a drop input of the first application window over the particular snap zone; and in response to the drop input, resizing and repositioning the first application window according the particular snap zone.

In an example, the invocation region is between a border of the display and an invocation-threshold distance from the border of the display. In another example, the invocation region is a region outside a radius threshold from where the drag input begins. In still another example, the method further includes accessing display characteristics for the display; and generating the plurality of display layouts based on the display characteristics. In yet another example, a quantity of display layouts in the plurality of display layouts is based on the display characteristics. In still yet another example, the display characteristics include a display orientation.

In another aspect, the technology relates to a method for reconfiguring application windows in a display. The method includes displaying a plurality of application windows in a desktop extended across multiple displays, the plurality of application windows including a first application window and a second application window, and the multiple displays including a first display and a second display; receiving a drag input for moving the first application window into an invocation region of the first display; based on the drag input entering the invocation region of the first display, displaying a first layout menu with a first plurality of display layouts, each of the display layouts including one or more snap zones, wherein the first plurality of display layouts are based on display characteristics of the first display; receiving a drag input for moving the first application window into an invocation region of the second display; and based on the drag input entering the invocation region of the second display, displaying a second layout menu with a second plurality of display layouts, each of the display layouts including one or more snap zones, wherein the second plurality of display layouts are based on display characteristics of the second display.

In an example, the first plurality of display layouts are different than the second plurality of display layouts. In another example, the first display is smaller than the second display, and the second plurality of display layouts has a larger quantity of display layouts than the first plurality of display layouts. In a further example, the method further includes based on the hover of the first application window over a particular snap zone of a display layout of the second plurality of display layouts, displaying, in the second display, a zone-indicator pane corresponding to the particular snap zone; receiving a drop input of the first application window over the particular snap zone; in response to the drop input, resizing and repositioning the first application window according the particular snap zone; and displaying the resized, repositioned first application window in the second display.

Aspects of the present disclosure, for example, are described above with reference to block diagrams and/or operational illustrations of methods, systems, and computer program products according to aspects of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for reconfiguring application windows in a display, the system comprising:
   a display;
   a processor; and
   a computer-readable medium comprising instructions that, when executed by the processor, cause the processor to control the system to perform operations comprising:
      displaying, on the display, an application window having a title bar and a content area;
      receiving an input selecting the title bar of the application window;
      receiving a drag input for moving the application window;
      based on the drag input entering an invocation region, displaying a layout menu with a plurality of display layouts, each of the display layouts including one or more snap zones;
      receiving a drop input of the application window over a particular snap zone of a particular display layout of the plurality of display layouts; and
      in response to the drop input, repositioning the application window according to the particular snap zone.

2. The system of claim 1, wherein the invocation region is an invocation-threshold distance from a border of the display.

3. The system of claim 1, wherein the application window is also resized according to the particular snap zone.

4. The system of claim 1, wherein the operations further comprise:
   displaying the repositioned application window;
   displaying, concurrently with the application window, a pending-zone indicator corresponding to another snap zone of the particular display layout;
   displaying, within the pending-zone indicator, a representation of a second application window;
   receiving a selection of the representation of the second application window; and
   in response to receiving the selection, displaying the second application window according to the pending-zone indicator.

5. The system of claim 4, wherein the representation of the second application window includes a display of a title segment including a title of the second application window.

6. The system of claim 1, wherein the operations further comprise:
   accessing display characteristics for the display; and
   generating the plurality of display layouts based on the display characteristics.

7. The system of claim 6, wherein a quantity of display layouts in the plurality of display layouts is based on the display characteristics.

8. The system of claim 6, wherein arrangements of the one or more snap zones in the plurality of display layouts are based on the display characteristics.

9. The system of claim 6, wherein the display characteristics include a display orientation.

10. The system of claim 1, wherein the operations further comprise:
    determining application characteristics for an application of the application window; and
    generating the plurality of display layouts based on the application characteristics.

11. A method for reconfiguring application windows in a display, the method comprising:
    displaying an application window;
    receiving a drag input for moving the application window;
    based on the drag input entering an invocation region, displaying a layout menu with a plurality of display layouts, each of the display layouts including one or more snap zones;
    receiving a hover of the application window over a particular snap zone of a particular display layout of the plurality of display layouts; and
    based on the hover of the application window over the particular snap zone, displaying a zone-indicator pane corresponding to the particular snap zone.

12. The method of claim 11, wherein the invocation region is between a border of the display and an invocation-threshold distance from the border of the display.

13. The method of claim 11, wherein the invocation region is a region outside a radius threshold from where the drag input begins.

14. The method of claim 11, further comprising:
    accessing display characteristics for the display; and
    generating the plurality of display layouts based on the display characteristics.

15. The method of claim 14, wherein a quantity of display layouts in the plurality of display layouts is based on the display characteristics.

16. The method of claim 14, further comprising:
    receiving a drop input of the application window over the particular snap zone; and
    in response to the drop input, resizing and repositioning the application window according the particular snap zone.

17. A method for reconfiguring application windows in a display, the method comprising:
    displaying an application window in a desktop extended across multiple displays including a first display and a second display;
    receiving a first input for moving the application window into an invocation region of the first display;
    based on the first input, displaying a first layout menu with a first plurality of display layouts, each of the display layouts including one or more snap zones, wherein the first plurality of display layouts are based on display characteristics of the first display;
    receiving a second input for moving the application window into an invocation region of the second display; and
    based on the second input, displaying a second layout menu with a second plurality of display layouts, each of the display layouts including one or more snap zones, wherein the second plurality of display layouts are based on display characteristics of the second display.

18. The method of claim 17, wherein the first plurality of display layouts are different than the second plurality of display layouts.

19. The method of claim 17, wherein the first display is smaller than the second display, and the second plurality of display layouts has a larger quantity of display layouts than the first plurality of display layouts.

20. The method of claim 17, further comprising:
    based on a hover of the application window over a particular snap zone of a display layout of the second plurality of display layouts, displaying, in the second display, a zone-indicator pane corresponding to the particular snap zone;
    receiving a drop input of the application window over the particular snap zone;

in response to the drop input, resizing and repositioning the application window according to the particular snap zone; and displaying the resized, repositioned application window in the second display.

\* \* \* \* \*